US012247659B2

(12) United States Patent
Kobayashi et al.

(10) Patent No.: US 12,247,659 B2
(45) Date of Patent: Mar. 11, 2025

(54) CONTINUOUSLY VARIABLE TRANSMISSION

(71) Applicant: HONDA MOTOR CO., LTD., Tokyo (JP)

(72) Inventors: Shuhei Kobayashi, Tokyo (JP); Jun Takahashi, Tokyo (JP); Takahiro Hatano, Tokyo (JP); Yukihiro Hayakawa, Tokyo (JP); Tokuma Kaiho, Tokyo (JP); Masao Takiguchi, Tokyo (JP); Koichiro Inukai, Tokyo (JP); Junpei Kaneta, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/584,714

(22) Filed: Feb. 22, 2024

(65) Prior Publication Data
US 2024/0288053 A1    Aug. 29, 2024

(30) Foreign Application Priority Data
Feb. 28, 2023   (JP) ................... 2023-029948

(51) Int. Cl.
*F16H 9/18*     (2006.01)
*F16H 57/035*   (2012.01)
*F16H 63/34*    (2006.01)

(52) U.S. Cl.
CPC ............ *F16H 9/18* (2013.01); *F16H 57/035* (2013.01); *F16H 63/3425* (2013.01)

(58) Field of Classification Search
CPC ...... F16H 9/18; F16H 57/035; F16H 63/3425; F16H 63/3416
(Continued)

(56) References Cited

U.S. PATENT DOCUMENTS 4,487,302 A * 12/1984 Morimoto ........... F16H 63/3416
                                                        192/219.5
4,645,046 A *  2/1987 Takano ............. F16H 61/66254
                                                        192/219.5
(Continued)

FOREIGN PATENT DOCUMENTS

JP    2014-206258 A    10/2014
JP    2022-034283 A     3/2022

OTHER PUBLICATIONS

Jun. 18, 2024, Translation of Japanese Office Action issued for related JP Application No. 2023-029948.

*Primary Examiner* — Henry Y Liu
(74) *Attorney, Agent, or Firm* — Paratus Law Group, PLLC (57) ABSTRACT

A continuously variable transmission includes, in a case: a drive pulley and a driven pulley each including a fixed-side pulley half and a movable-side pulley half configured to move to the fixed-side pulley half; a belt including a plurality of elements and a plurality of rings wound around the drive pulley and the driven pulley; a parking gear provided to the fixed-side pulley half of the driven pulley; and a parking pawl configured to be fitted to the parking gear, the continuously variable transmission transmitting a driving force to a wheel while changing a transmission ratio by changing groove widths of the drive pulley and the driven pulley, wherein the case includes an annular rib integrally molded with the case in a manner surrounding an outer periphery of the parking gear except for a position intersecting a swing trajectory of the parking pawl and a predetermined position.

13 Claims, 10 Drawing Sheets

(58) Field of Classification Search
USPC ............................................................ 474/8
See application file for complete search history.

(56) References Cited

U.S. PATENT DOCUMENTS

| | | | | |
|---|---|---|---|---|
| 5,649,457 | A * | 7/1997 | Kudou | F16H 63/3416 475/210 |
| 6,164,427 | A * | 12/2000 | Ogawa | B60T 1/005 192/219.5 |
| 6,585,613 | B1 * | 7/2003 | Walter | F16H 61/66272 474/70 |
| 7,364,027 | B2 * | 4/2008 | Matsubara | F16H 57/031 192/219.5 |
| 10,215,279 | B2 * | 2/2019 | Iwatsuru | F16H 61/662 |
| 11,203,990 | B2 * | 12/2021 | Moro | F02N 11/0837 |
| 11,535,229 | B2 * | 12/2022 | Lee | F16H 59/18 |
| 2005/0233841 | A1 * | 10/2005 | Matsubara | F16H 63/3416 474/8 |
| 2005/0233847 | A1 * | 10/2005 | Kuroda | F16H 63/3416 474/50 |
| 2006/0070839 | A1 * | 4/2006 | Sugano | F16H 63/3416 192/219.5 |
| 2014/0305764 | A1 | 10/2014 | Yokomachi et al. | |
| 2016/0290504 | A1 * | 10/2016 | Iwatsuru | F16H 9/12 |
| 2021/0293188 | A1 * | 9/2021 | Moro | F02D 29/02 |
| 2022/0055601 | A1 * | 2/2022 | Lee | B60W 30/19 |

* cited by examiner

CONTINUOUSLY VARIABLE TRANSMISSION

CROSS-REFERENCE TO RELATED APPLICATIONS

This application is based on and claims priority under 35 USC 119 from Japanese Patent Application No. 2023-029948 filed on Feb. 28, 2023, the entire content of which is incorporated herein by reference.

TECHNICAL FIELD

The present invention relates to a continuously variable transmission that can be mounted on a vehicle.

BACKGROUND ART

There has been a continuously variable transmission for transmitting the driving force from the drive source to the wheels while changing the transmission ratio by changing the groove widths of the drive pulley and the driven pulley. In such a continuously variable transmission, the fixed-side pulley half of the driven pulley is provided with a parking gear. A parking pawl swings and engages with the parking gear, thereby maintaining the stopped state of the vehicle.

In the continuously variable transmission described in JP2014-206258A, the outer peripheral surface of the parking gear is covered with a cover member attached to the case. Accordingly, foreign matters can be blocked by the cover member and prevented from intruding or approaching the parking gear.

However, according to the structure described in JP2014-206258A, it is necessary to attach the cover member to the case, and there is room for improvement in terms of cost and productivity.

SUMMARY

The present invention provides a continuously variable transmission that can prevent failure due to foreign matters intruding and/or approaching a parking gear and is excellent in cost and productivity.

The present invention is:
a continuously variable transmission including, in a case:
a drive pulley and a driven pulley each including a fixed-side pulley half and a movable-side pulley half configured to move axially relative to the fixed-side pulley half;
a belt including a plurality of elements and a plurality of rings wound around the drive pulley and the driven pulley;
a parking gear provided to the fixed-side pulley half of the driven pulley; and
a parking pawl configured to be fitted to the parking gear by swinging,
the continuously variable transmission transmitting a driving force from a drive source to a wheel while changing a transmission ratio by changing groove widths of the drive pulley and the driven pulley, in which
the case includes an annular rib integrally molded with the case in a manner surrounding an outer periphery of the parking gear except for a position intersecting a swing trajectory of the parking pawl and a predetermined position.

According to the present invention, intrusion and/or approach of foreign matters to the parking gear can be prevented without the need of using a component separate from the case, which improves the cost and the productivity.

DESCRIPTION OF EMBODIMENTS

Hereinafter, an embodiment of a continuously variable transmission of the present invention will be described with reference to the accompanying drawings.

Figure 1:
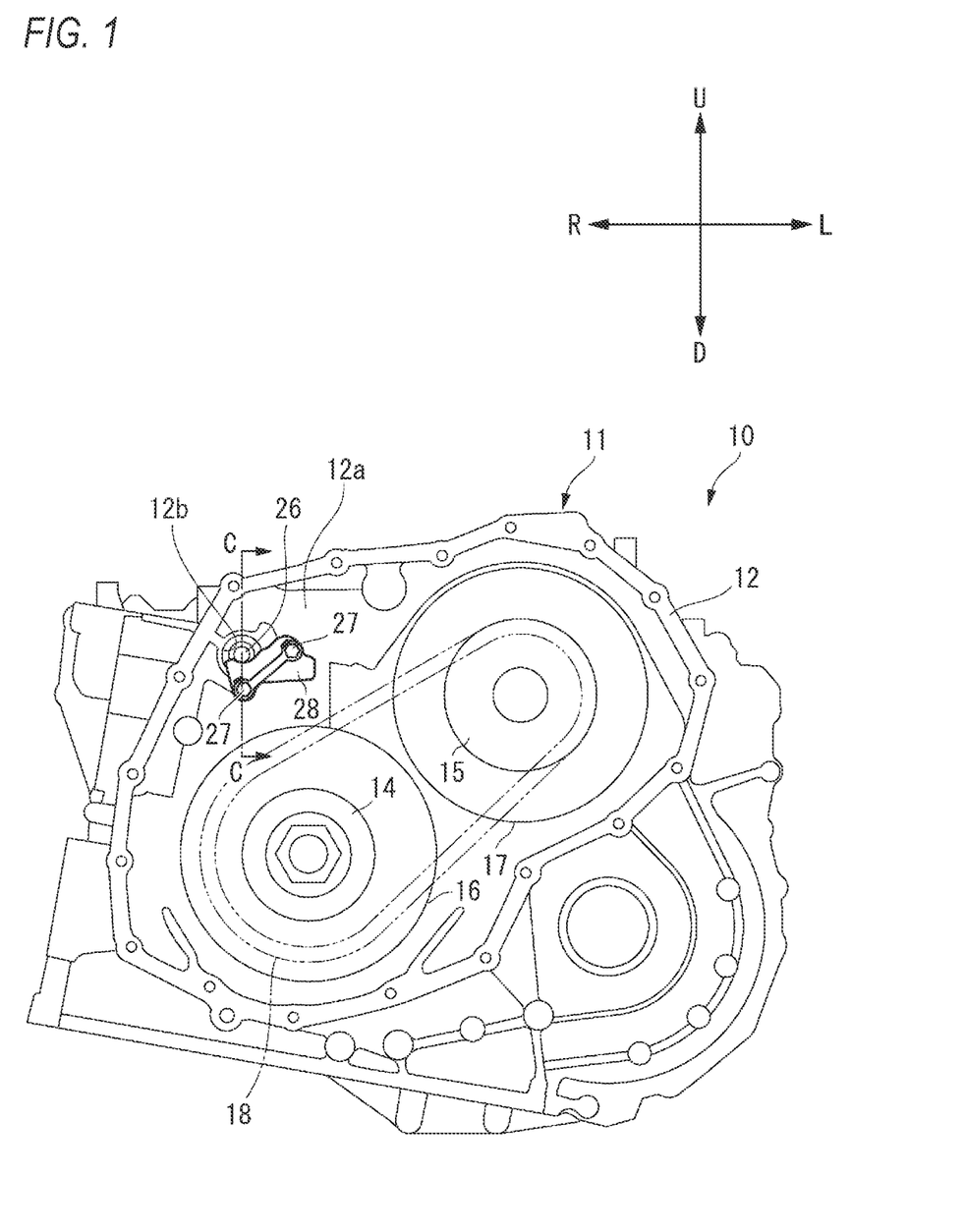
FIG. 1 is a diagram of a first case 12 of a transmission case 11 as viewed from inside.
Figure 2:
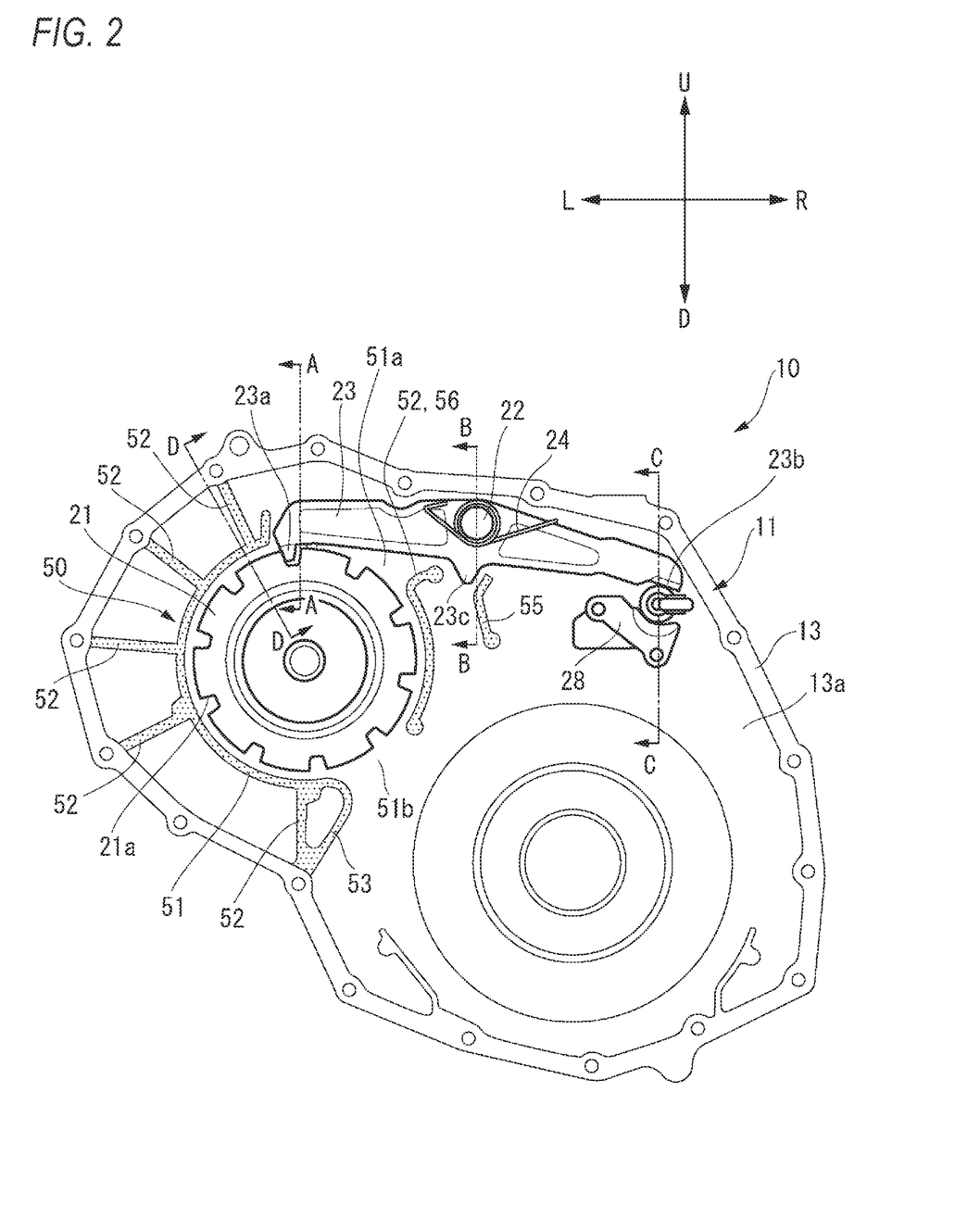
FIG. 2 is a diagram of a second case 13 of the transmission case 11 as viewed from inside.

As illustrated in FIGS. 1 and 2, the continuously variable transmission 10 includes a drive pulley 16, a driven pulley 17, a metal belt 18 wound around the drive pulley 16 and the driven pulley 17, a parking lock device, and a transmission case 11 housing the above.

The transmission case 11 includes a first case 12 whose one end surface is joined to an engine (not illustrated), and a second case 13 that is joined to close the other end surface of the first case 12. The first case 12 and the second case 13 support an input shaft 14 and an output shaft 15 in parallel to each other. A drive pulley 16 provided to the input shaft 14 positioned on the lower side and a driven pulley 17 provided to the output shaft 15 positioned on the upper side are wound around by a metal belt 18.

Figure 10:
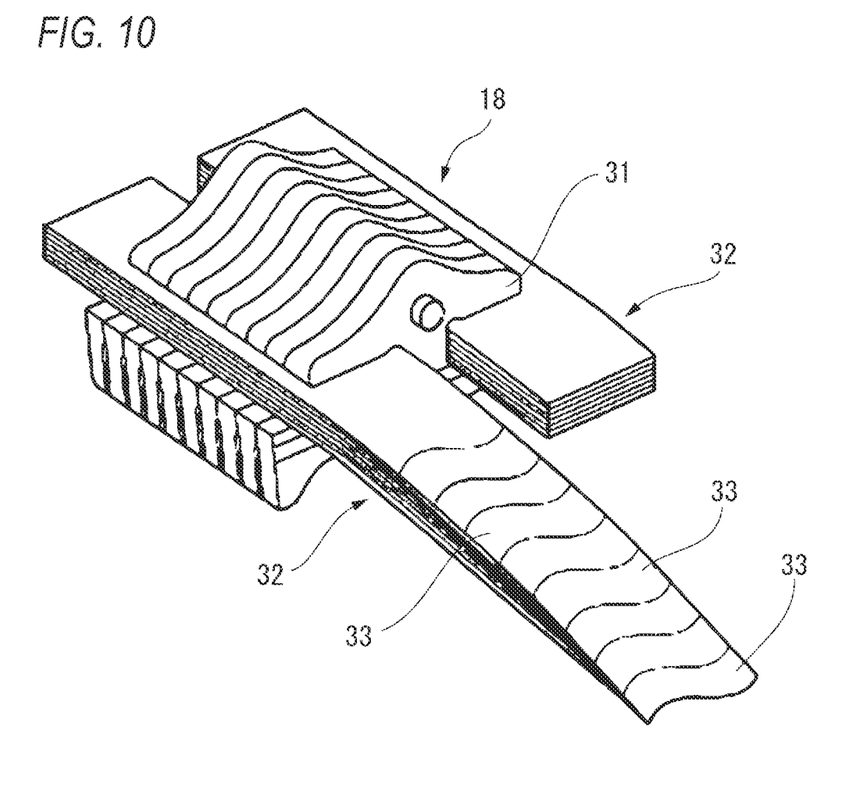
FIG. 10 is an exploded perspective view of a part of a metal belt 18.

As illustrated in FIG. 10, the metal belt 18 is configured by annularly coupling a plurality of elements 31 made from a metal plate with a pair of left and right endless laminated rings 32 made of a metal. Each of the laminated rings 32 is formed by laminating a plurality of metal rings 33 made from thin steel.

Figure 3:
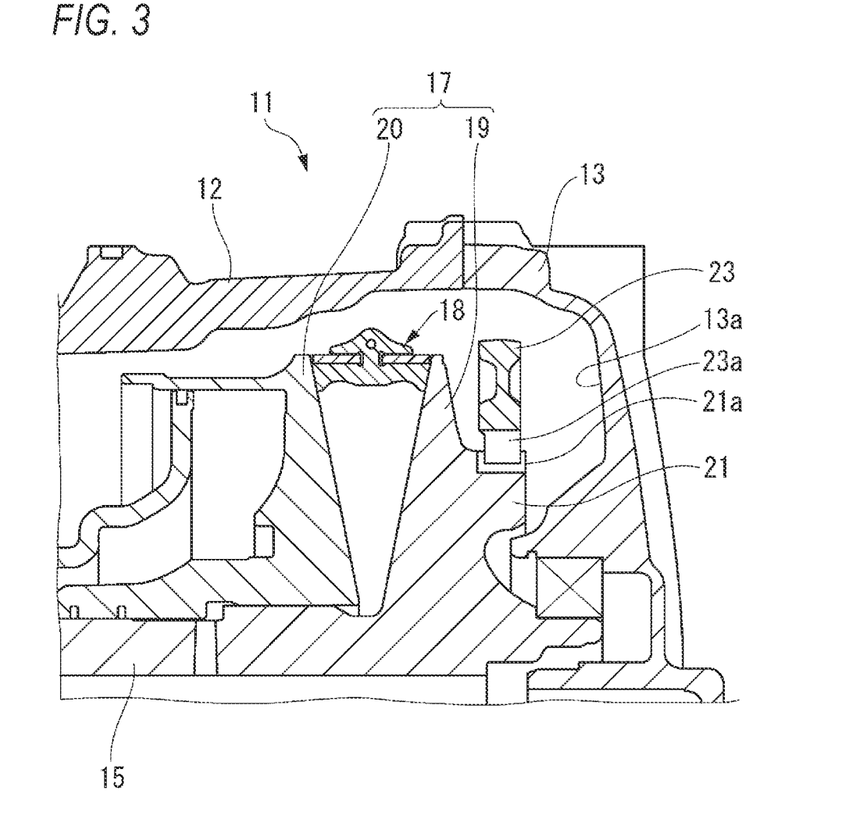
FIG. 3 is a cross-sectional view taken along line A-A of FIG. 2.
Figure 9:
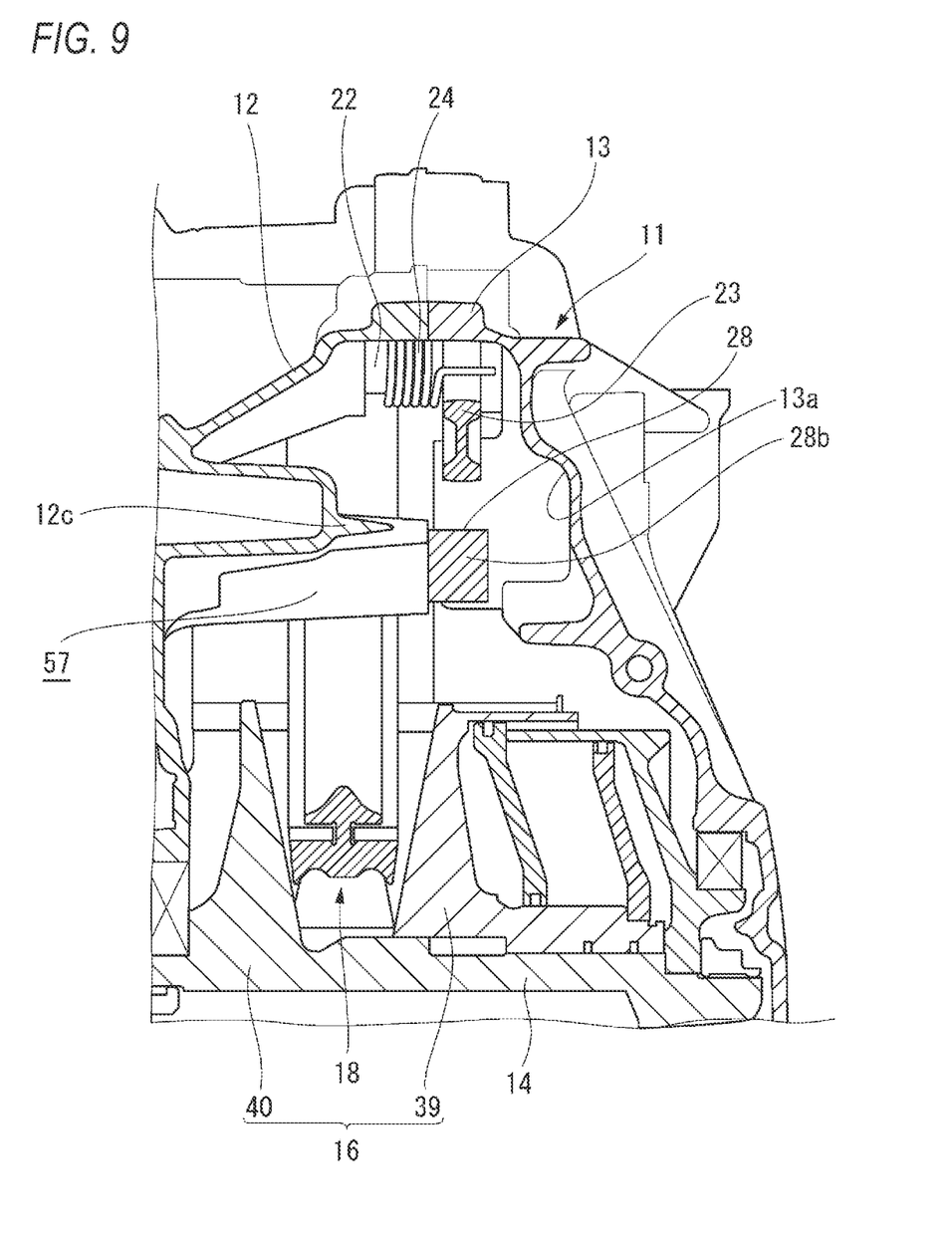
FIG. 9 is a cross-sectional view taken along line E-E of FIG. 8.

As illustrated in FIG. 3, the driven pulley 17 includes: a fixed-side pulley half 19 fixed to the output shaft 15 in a manner facing an inner wall 13a of the second case 13; and a movable-side pulley half 20 supported on the output shaft 15 in a manner not relatively rotatable but axially slidable, and capable of approaching and separating from the fixed-side pulley half 19 by hydraulic pressure. Similarly, as illustrated in FIG. 9, the drive pulley 16 includes a fixed-side pulley half 40 and a movable-side pulley half 39. By changing the groove width of the drive pulley 16 and the groove width of the driven pulley 17, the effective radii of both the pulleys 16 and 17 are changed, and the transmission ratio is changed continuously.

Figure 4:
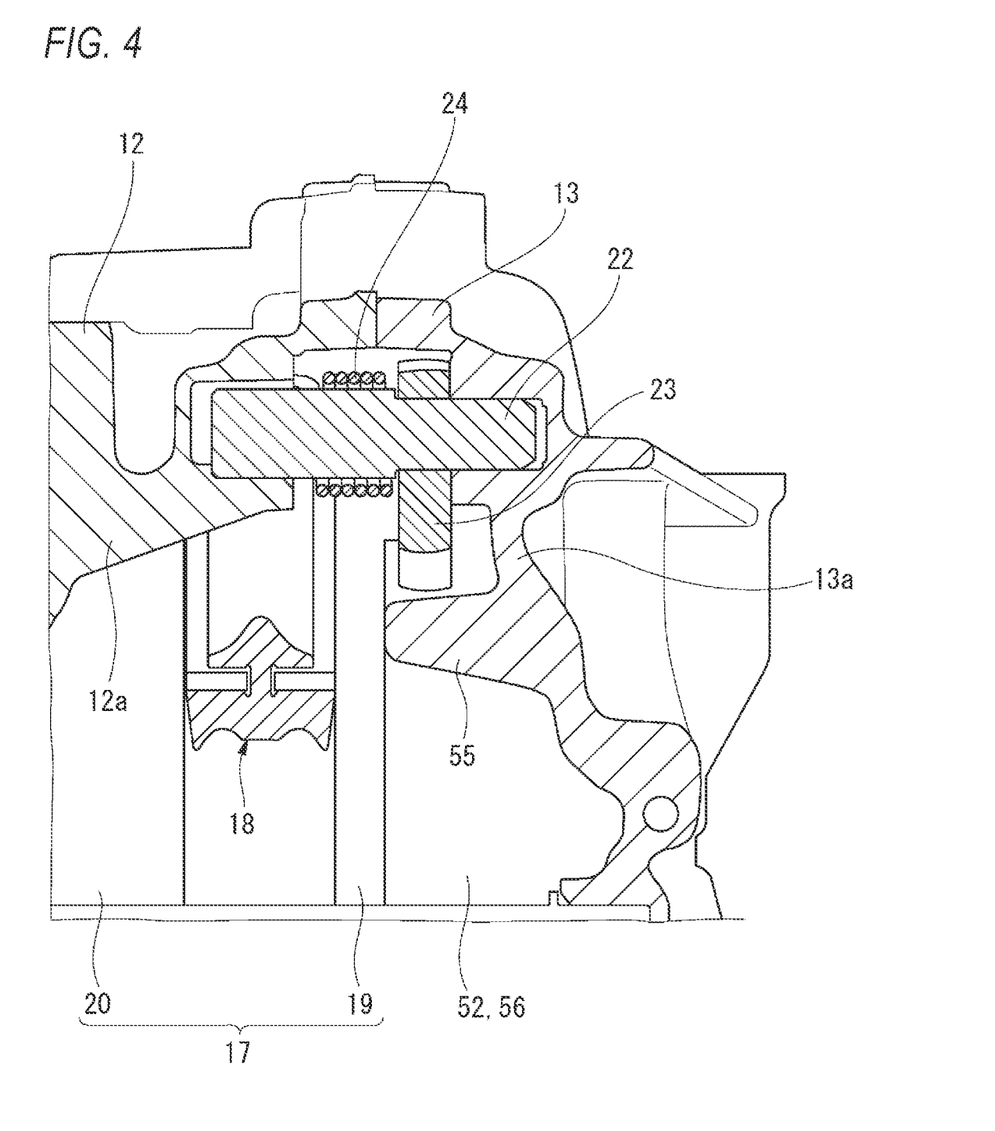
FIG. 4 is a cross-sectional view taken along line B-B of FIG. 2.

Next, the structure of a parking lock device for restraining the rotation of the output shaft 15 when stopping the vehicle will be described with reference to FIGS. 3 to 5.

As illustrated in FIGS. 2 and 3, the back surface of the fixed-side pulley half 19 of the driven pulley 17 is integrally formed with an annular parking gear 21 protruding toward the inner wall 13a of the second case 13. The outer peripheral surface of the parking gear 21 is formed with a plurality of tooth grooves 21a. Referring also to FIG. 4, the transmission case 11 is provided with a parking pawl 23 bent in a V shape in a manner facing the parking gear 21 on the radially outer side of the outer peripheral surface of the driven pulley 17. The intermediate portion of the parking pawl 23 is swingably supported by a support shaft 22 fixed to an inner wall 12a of the first case 12 and the inner wall 13a of the second case 13. The tip end of the parking pawl 23 is formed with a locking claw 23a engageable with one of the tooth grooves 21a of the parking gear 21. The parking pawl 23 is biased clockwise in FIG. 2 by the elastic force of a torsion spring 24 wound around the outer periphery of the support shaft 22, such that the locking claw 23a is separated from the tooth grooves 21a of the parking gear 21. The base end side of the parking pawl 23 is formed with a cam surface 23b in contact with a conical cam member 26 of the parking rod 25.

Figure 5:
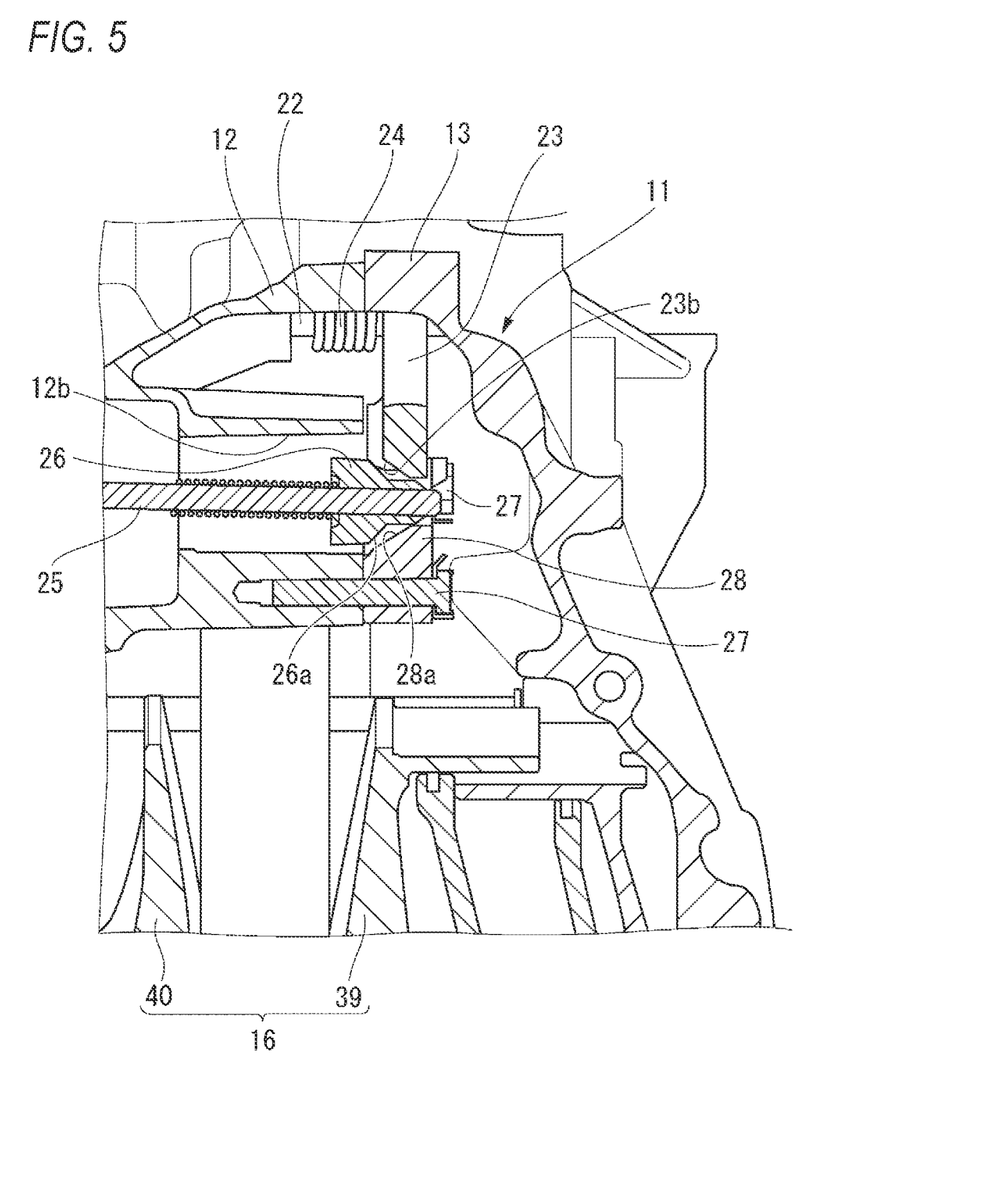
FIG. 5 is a cross-sectional view taken along line C-C of FIGS. 1 and 2.

As illustrated in FIG. 5, the parking rod 25 penetrates through a through hole 12b formed in the inner wall 12a of the first case 12 into the second case 13. The cam member 26 is provided at the tip end of the parking rod 25. The parking rod 25 is coupled to a shift lever (or actuator) (not illustrated) and is axially movable. The cam member 26 of the parking rod 25 is guided by the through hole 12b of the inner wall 12a and an arc-shaped guide surface 28a of a guide member 28 fixed to the inner wall 12a by two bolts 27, 27.

When the driver selects a range other than the parking range with the shift lever, the parking pawl 23 is in a non-actuated position due to the elastic force of the torsion spring 24, the locking claw 23a of the parking pawl 23 is separated from the tooth groove 21a of the parking gear 21, the restraint of the output shaft 15 is released, and the parking lock device comes into a non-actuated state. When the driver selects the parking range with the shift lever, the cam member 26 protrudes from the through hole 12b, and the cam surface 26a presses the cam surface 23b formed on the base end side of the parking pawl 23 (see FIG. 5). As a result, the parking pawl 23 swings counterclockwise around the support shaft 22 in FIG. 2, the locking claw 23a engages with one of the tooth grooves 21a of the parking gear 21, the rotation of the output shaft 15 is restrained as illustrated in FIG. 2, and the parking lock device is actuated.

At this time, if a foreign matter intrudes the transmission case 11 or a fragment of a component disposed inside the transmission case 11, for example, a metal ring 33, falls off and becomes a foreign matter, the locking claw 23a of the parking pawl 23 or the parking gear 21 may be damaged or a failure may occur if the foreign matter intrudes and/or approaches the parking gear 21. The transmission case 11 is provided with a foreign matter intrusion prevention structure for preventing intrusion of foreign matters into the parking gear 21.

Hereinafter, the foreign matter intrusion prevention structure for preventing intrusion of foreign matter into the parking gear 21 will be described. In the following description, the broken metal belt 18 is assumed as the foreign matter.

The foreign matter intrusion prevention structure is formed by combining a foreign matter intrusion prevention structure centered on an annular rib 51 provided in the vicinity of the driven pulley 17 and a foreign matter intrusion prevention structure formed by an auxiliary rib 54 provided in the vicinity of the drive pulley 16, either of which may be used alone.

The foreign matter intrusion prevention structure in the vicinity of the driven pulley 17 is integrally molded with the second case 13, and is configured with a wall surface rising axially from the inner wall 13a. As illustrated in FIG. 2, the foreign matter intrusion prevention structure includes a circular annular rib 51, a plurality of radial ribs 52 extending radially outward from the annular rib 51 around the axis of the output shaft 15, a coupling rib 53 extending from the lower portion of the annular rib 51 and coupled to the lower end of the second case 13, and an isolated rib 55 disposed in the vicinity of the parking pawl 23. In FIG. 2, the annular rib 51, the radial ribs 52, the coupling rib 53, and the isolated rib 55 are hatched for easy understanding.

The annular rib 51 is integrally molded with the second case 13 in a manner surrounding the outer periphery of the parking gear 21 except for a position intersecting the swing trajectory of the parking pawl 23 and a predetermined position. The annular rib 51 preferably covers the outer periphery of the parking gear 21 by at least 180 degrees. In this case, the annular rib 51 does not need to continuously cover the outer periphery of the parking gear 21 by 180 degrees or more, and may be discretely arranged to cover the outer periphery of the parking gear 21 by 180 degrees or more as a whole. The annular rib 51 of the present embodiment has a first opening 51a provided at the position intersecting the swing trajectory of the parking pawl 23, and a second opening 51b provided at a position not overlapping the region obtained by objecting the movement trajectory of the metal belt 18 and below the first opening 51a.

By surrounding the outer periphery of the parking gear 21 with the annular rib 51 in this manner, foreign matter such as fragments of the metal belt 18 of the continuously variable transmission 10 can be prevented from intruding and/or approaching the parking gear 21 even if the metal belt 18 is broken. Further, the annular rib 51 can be integrally molded with the second case 13, which improves the cost and the productivity without the need of using a separate component. Further, the first opening 51a can avoid interfering with the swinging of the parking pawl 23, and a foreign matter entering the inside of the annular rib 51 can be discharged from the second opening 51b. Further, the second opening 51b is provided at a position that does not overlap the projected region of the movement trajectory of the metal belt 18, which can prevent foreign matters from entering the inside of the annular rib 51 from the second opening 51b even if the metal belt 18 is broken.

Figure 6:
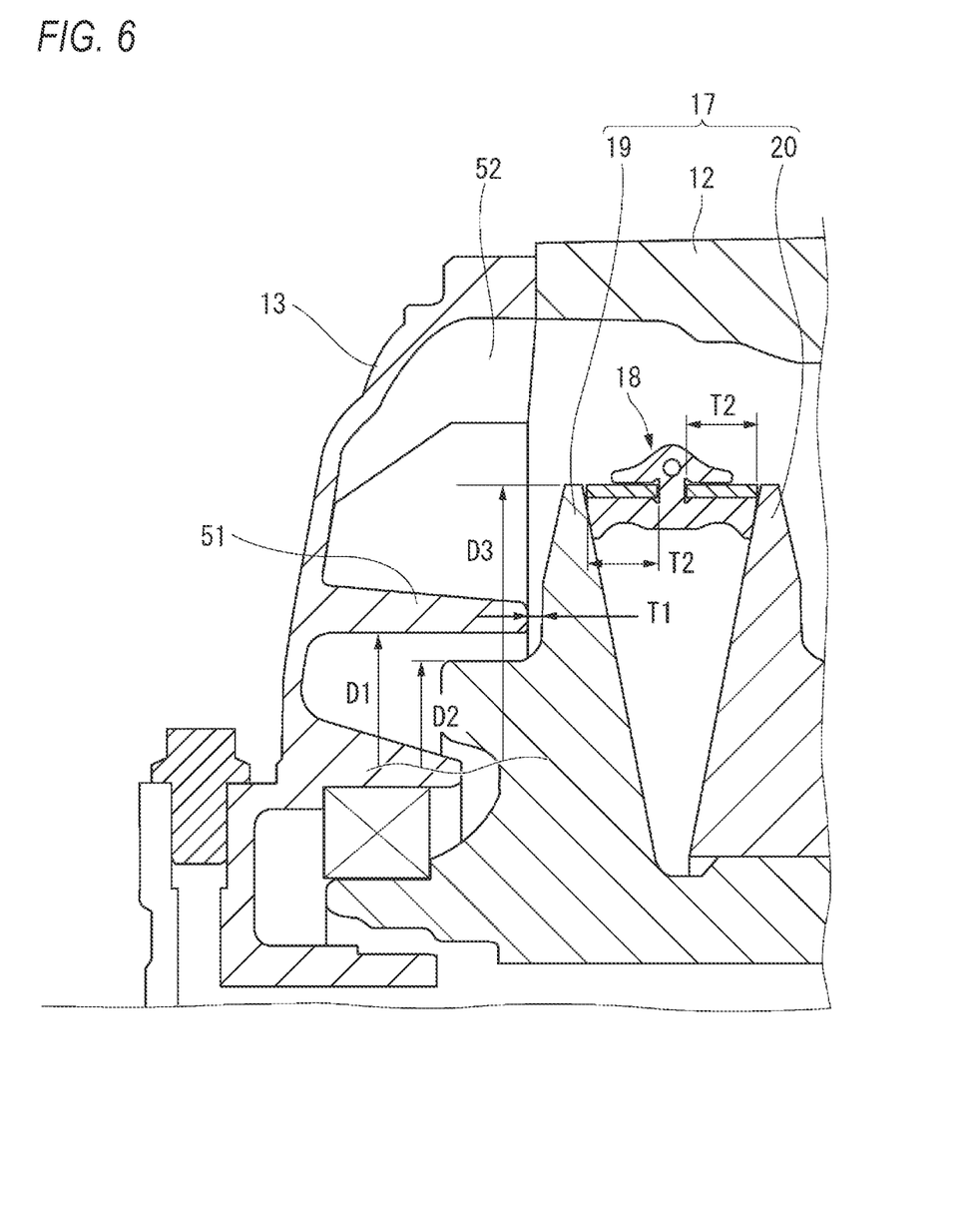
FIG. 6 is a cross-sectional view taken along line D-D of FIG. 2.

As illustrated in FIG. 6, an inner diameter D1 of the annular rib 51 is larger than an outer diameter D2 of the parking gear 21 and equal to or smaller than an outer diameter D3 of the driven pulley 17. A gap T1 between the annular rib 51 and the fixed-side pulley half 19 of the driven pulley 17 is smaller than a width T2 of the metal rings 33 constituting the metal belt 18. Accordingly, a broken metal ring 33 can be prevented from entering the gap between the annular rib 51 and the fixed-side pulley half 19 of the driven pulley 17.

The present embodiment is provided with six radial ribs 52, four provided to the left of the parking gear 21 at equal intervals, one provided to the lower right of the parking gear 21, and the remaining one provided to the upper right.

Hereinafter, the radial rib 52 provided to the upper right among the six radial ribs 52 is referred to as a shielding rib 56. The shielding rib 56 is not necessarily the radial ribs 52, and is not necessarily continuous from the annular rib 51.

Returning to FIG. 2, the shielding rib 56 extends from one end of the first opening 51a of the annular rib 51 toward the support shaft 22 as the swing fulcrum of the parking pawl 23. The tip end of shielding rib 56 has a gap from the parking gear 21 equal to or smaller than a predetermined width, preferably, equal to or smaller than the width T2 of the metal rings 33 in a state where the parking pawl 23 is not fitted. Accordingly, fragments of the metal ring 33 broken on the side closer to the drive pulley 16 can be prevented from scattering toward the parking gear 21.

In the present embodiment, the tip end of the shielding rib 56 has a shape warped toward the drive pulley 16. Thereby, fragments of the broken metal ring 33 hit the shielding rib 56 and can be prevented from intruding the parking gear 21.

Figure 7:
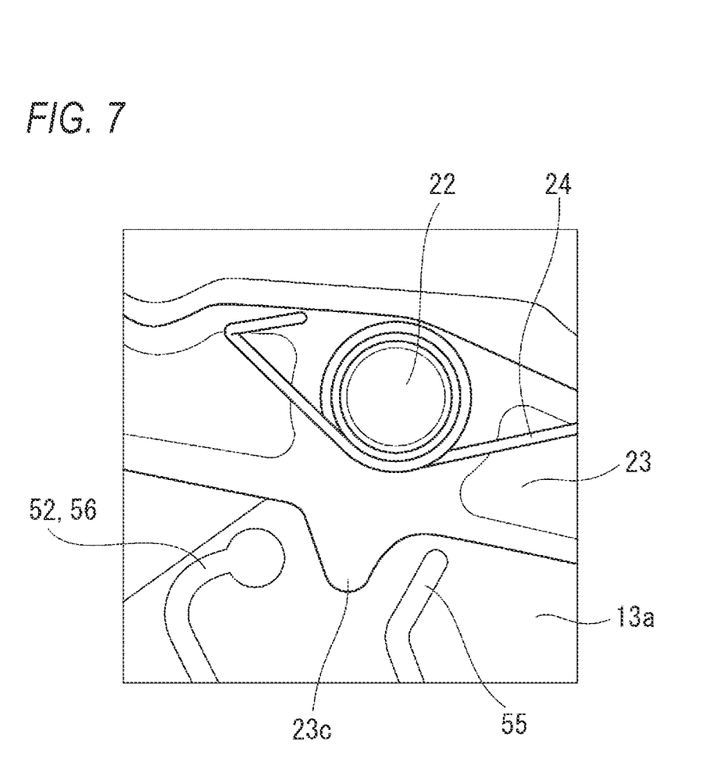
FIG. 7 is an enlarged view of the periphery of a support shaft 22 of a parking pawl 23.

Referring also to FIG. 7, the isolated rib 55 isolated from the shielding rib 56 is provided closer to the drive pulley 16 than is the shielding rib 56. The isolated rib 55 is disposed below the parking pawl 23 in a manner facing the shielding rib 56.

Here, the parking pawl 23 is provided with a projection 23c at the lower portion thereof. Accordingly, the parking pawl 23 can be brought close to the shielding rib 56 and the isolated rib 55. That is, the tip end of the shielding rib 56 can have a gap from the parking gear 21 equal to or smaller than the predetermined width in the state where the parking pawl 23 is not fitted, while the tip end of the isolated rib 55 can have a gap from the parking gear 21 equal to or smaller than the predetermined width, preferably, equal to or smaller than the width T2 of the metal rings 33 in the state where the parking pawl 23 is not fitted.

Accordingly, the parking pawl 23, the isolated rib 55, and the shielding rib 56, can form a labyrinth gap, and the fragments of the metal ring 33 broken on the side closer to the drive pulley 16 can be more reliably prevented from scattering toward the parking gear 21.

The coupling rib 53 extends from the lower portion of the annular rib 51 and is coupled to the lower end of the second case 13. More specifically, the coupling rib 53 is formed continuously from the annular rib 51 to the lower end of the first case 12 without a break. Accordingly, fragments of the metal rings 33 broken on the side closer to the drive pulley 16 can be prevented from scattering from the lower side of the driven pulley 17 toward the parking gear 21.

According to such a foreign matter intrusion prevention structure in the vicinity of the driven pulley 17, since the outer peripheral surface of the parking gear 21 is covered with the annular rib 51, foreign matters can be prevented from intruding and/or approaching the parking gear 21 and the parking pawl 23. In particular, the broken metal ring 33, which is an elongated flexible foreign matter, is prevented from intruding and/or approaching the outer periphery of the parking gear 21. Accordingly, damage to the parking lock device and occurrence of failure can be avoided more reliably.

Further, since the lower portion of the annular rib 51 is formed with the second opening 51b, a foreign matter intruding the inside from the first opening 51a of the annular rib 51 can be discharged from the second opening 51b to the outside, thereby prevented from staying in the annular rib 51.

Figure 8:
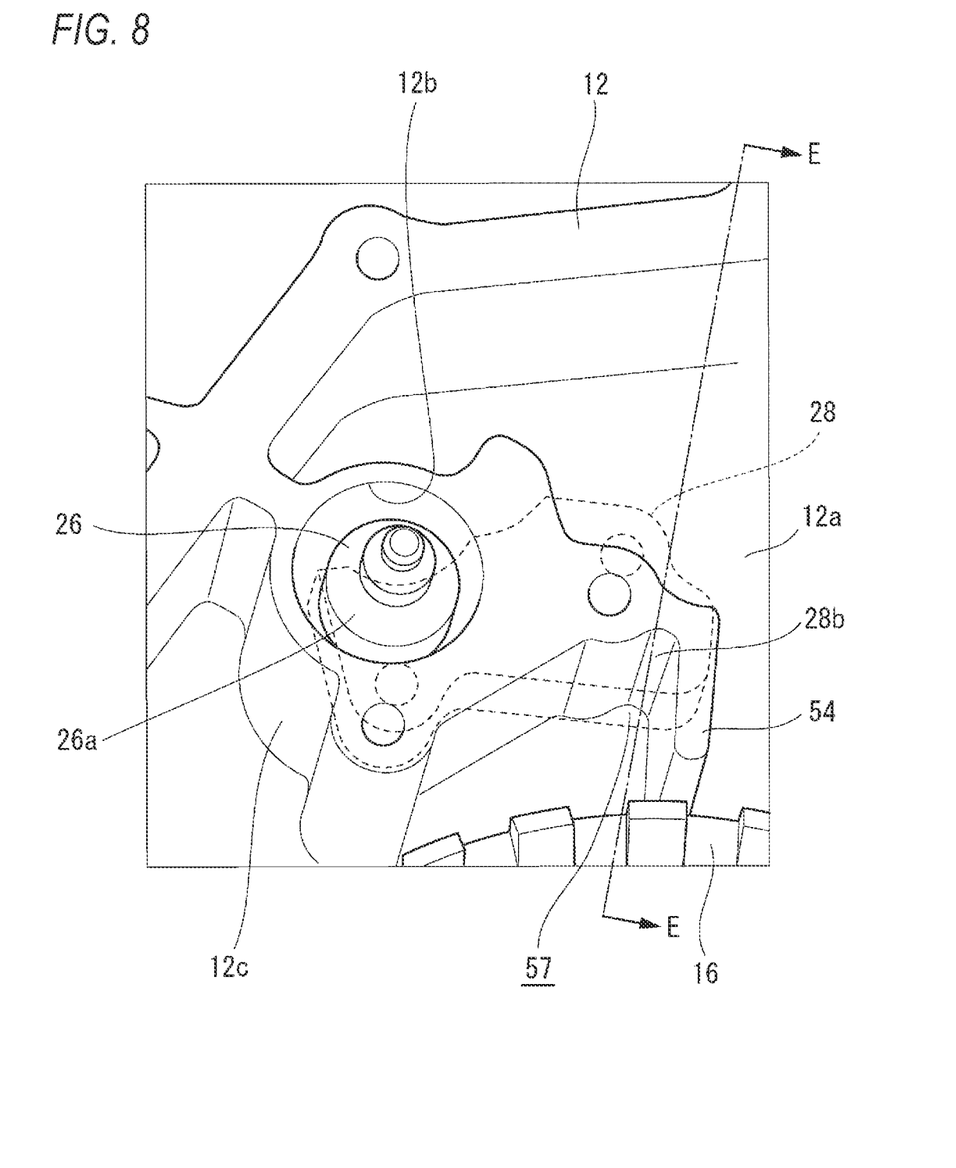
FIG. 8 is an enlarged perspective view of the periphery of a guide support 12c.

On the other hand, the foreign matter intrusion prevention structure in the vicinity of the drive pulley 16 is integrally molded with the first case 12, and is configured with a wall surface rising axially from the inner wall 12a. As illustrated in FIGS. 8 and 9, the foreign matter intrusion prevention structure includes the auxiliary rib 54 extending from the guide support 12c holding the guide member 28 toward the drive pulley 16.

As illustrated in FIG. 8, the auxiliary rib 54 is integrally molded with the guide support 12c holding the guide member 28, and extends downward from the guide support 12c toward the drive pulley 16. The auxiliary rib 54 is formed such that the gap between the tip end thereof and the drive pulley 16 is equal to or smaller than a predetermined width, preferably equal to or smaller than the width T2 of the metal rings 33. Accordingly, fragments of the metal ring 33 broken on the side closer to the drive pulley 16 can be prevented from scattering from the drive pulley 16 toward the parking gear 21.

The guide member 28 bolt-fastened to the guide support 12c includes a guide extension 28b protruding from the lower surface of the guide support 12c toward the drive pulley 16. Accordingly, fragments of the metal ring 33 broken on the side closer to the drive pulley 16 can be further prevented from scattering from the drive pulley 16 toward the parking gear 21.

On the other hand, the lower surface of the guide support 12c is inclined upward toward the auxiliary rib 54. A space 57 is formed between the lower surface of the guide support 12c and the auxiliary rib 54. The guide extension 28b of the guide member 28 covers at least a part of the side surface of the auxiliary rib 54.

According to the foreign matter intrusion prevention structure in the vicinity of the drive pulley 16, since the space 57 is covered from the lateral side by the guide extension 28b, fragments of the metal ring 33 captured in the space 57 can be prevented from bypassing the auxiliary rib 54 from the lateral side and scattering toward the parking gear 21.

The auxiliary rib 54 is not necessarily formed continuously from the guide support 12c, and may be separated from the guide support 12c. In this case, the distance between the guide support 12c and the auxiliary rib 54 is preferably equal to or smaller than the width T2 of the metal rings 33.

Although various embodiments have been described above with reference to the drawings, it is needless to say that the present invention is not limited to these examples. It is apparent that those skilled in the art may conceive of various modifications and changes within the scope described in the claims, and it is understood that such modifications and changes naturally fall within the technical scope of the present invention. In addition, respective constituent elements in the above-described embodiment may be freely combined without departing from the gist of the invention.

In the present specification, at least the following matters are described.

Corresponding constituent elements and the like in the embodiments described above are shown in parentheses, but the present invention is not limited thereto.

(1) A continuously variable transmission (continuously variable transmission 10) including, in a case (transmission case 11):
a drive pulley (drive pulley 16) and a driven pulley (driven pulley 17) each including a fixed-side pulley half (fixed-side pulley half 19, 40) and a movable-side pulley half (movable-side pulley half 20, 39) configured to move axially relative to the fixed-side pulley half;

a belt (metal belt 18) including a plurality of elements (elements 31) and a plurality of rings (metal rings 33) wound around the drive pulley and the driven pulley;

a parking gear (parking gear 21) provided to the fixed-side pulley half of the driven pulley; and a parking pawl (parking pawl 23) configured to be fitted to the parking gear by swinging, the continuously variable transmission transmitting a driving force from a drive source to a wheel while changing a transmission ratio by changing groove widths of the drive pulley and the driven pulley, in which the case includes an annular rib (annular rib 51) integrally molded with the case in a manner surrounding an outer periphery of the parking gear except for a position intersecting a swing trajectory of the parking pawl and a predetermined position.

According to (1), by surrounding the outer periphery of the parking gear with the annular rib, foreign matters can be prevented from intruding and/or approaching the parking gear even if the belt of the continuously variable transmission is broken, which can prevent occurrence of failure. Further, the annular rib can be integrally molded with the case, which improves the cost and the productivity without the need of using a separate component.

(2) The continuously variable transmission according to (1), in which the annular rib has a first opening (first opening 51a) provided at the position intersecting the swing trajectory of the parking pawl, and a second opening (second opening 51b) provided at a position not overlapping a region obtained by objecting the movement trajectory of the belt and below the first opening.

According to (2), the first opening can avoid interfering with the swinging of the parking pawl, and a foreign matter entering the inside of the annular rib can be discharged from the second opening. Further, the second opening is provided at a position not overlapping the region obtained by objecting the movement trajectory of the belt, which can prevent foreign matters from entering the inside of the annular rib from the second opening even if the belt is broken.

(3) The continuously variable transmission according to (1), in which an inner diameter (inner diameter D1) of the annular rib is larger than an outer diameter (outer diameter D2) of the parking gear and is equal to or smaller than an outer diameter (outer diameter D3) of the driven pulley.

According to (3), foreign matters can be prevented from intruding and/or approaching the parking gear, which can prevent occurrence of failure.

(4) The continuously variable transmission according to (1), in which a gap (gap T1) between the annular rib and the fixed-side pulley half of the driven pulley is smaller than a width (width T2) of the rings constituting the belt.

According to (4), a broken ring can be prevented from entering the gap between the annular rib and the fixed-side pulley half of the driven pulley.

(5) The continuously variable transmission according to (1), in which the annular rib covers the outer periphery of the parking gear by at least 180 degrees.

According to (5), by sufficiently covering the outer periphery of the parking gear, foreign matters can be further prevented from intruding and/or approaching the parking gear, which can prevent occurrence of failure.

(6) The continuously variable transmission according to (1), in which the case includes a shielding rib (shielding rib 56) extending from the annular rib, and the shielding rib extends toward a swing fulcrum of the parking pawl, and has a tip end having a gap from the parking gear equal to or smaller than a predetermined width in a state where the parking pawl is not fitted.

According to (6), fragments of the ring broken on the side closer to the drive pulley can be prevented from scattering toward the parking gear.

(7) The continuously variable transmission according to (6), in which the shielding rib has a shape warped toward the drive pulley.

According to (7), fragments of the broken ring hit the shielding rib and can be prevented from intruding the parking gear.

(8) The continuously variable transmission according to (7), in which the case includes an isolated rib (isolated rib 55) provided on a side closer to the drive pulley than is the shielding rib and isolated from the shielding rib, the parking pawl includes a projection (projection 23c) at a lower portion thereof, the projection is provided between the isolated rib and the shielding rib, and a gap between the projection and the isolated rib is equal to or smaller than a predetermined width in the state where the parking pawl is not fitted.

According to (8), fragments of the ring broken on the side closer to the drive pulley can be further prevented from scattering toward the parking gear.

(9) The continuously variable transmission according to (1), in which the case includes a coupling rib (coupling rib 53) extending from a lower portion of the annular rib and coupled to a lower end of the case.

According to (9), fragments of the ring broken on the side closer to the drive pulley can be prevented from scattering from the lower side of the driven pulley toward the parking gear.

(10) The continuously variable transmission according to (9), in which the coupling rib is formed continuously from the annular rib to the lower end of the case without a break.

According to (10), fragments of the ring broken on the side closer to the drive pulley can be further prevented from scattering from the lower side of the driven pulley toward the parking gear.

(11) The continuously variable transmission according to (1), further including, in the case:

a parking rod (parking rod 25) configured to swing the parking pawl; and a guide member (guide member 28) configured to guide the parking rod, in which the case includes a guide support (guide support 12c) supporting the guide member, and an auxiliary rib (auxiliary rib 54) extending from the guide supporting portion and having a gap from the drive pulley equal to or smaller than a predetermined width.

According to (11), fragments of the ring broken on the side closer to the drive pulley can be prevented from scattering from the guide member toward the parking gear.

(12) The continuously variable transmission according to (11), in which the guide member includes a guide extension (guide extension 28b) extending toward the drive pulley.

According to (12), fragments of the ring broken on the side closer to the drive pulley can be further prevented from scattering from the guide member toward the parking gear.

(13) The continuously variable transmission according to (12), in which the guide extension covers at least a part of a side surface of the auxiliary rib.

According to (13), fragments hitting the auxiliary rib can be prevented from further scattering.

What is claimed is:

1. A continuously variable transmission comprising, in a case:
a drive pulley and a driven pulley each including a fixed-side pulley half and a movable-side pulley half configured to move axially relative to the fixed-side pulley half;
a belt including a plurality of elements and a plurality of rings wound around the drive pulley and the driven pulley;
a parking gear provided to the fixed-side pulley half of the driven pulley; and
a parking pawl configured to be fitted to the parking gear by swinging,
the continuously variable transmission transmitting a driving force from a drive source to a wheel while changing a transmission ratio by changing groove widths of the drive pulley and the driven pulley, wherein
the case includes an annular rib integrally molded with the case in a manner surrounding an outer periphery of the parking gear except for a position intersecting a swing trajectory of the parking pawl and a predetermined position.

2. The continuously variable transmission according to claim 1, wherein
the annular rib has
a first opening provided at the position intersecting the swing trajectory of the parking pawl, and
a second opening provided at a position not overlapping a region obtained by objecting the movement trajectory of the belt and below the first opening.

3. The continuously variable transmission according to claim 1, wherein
an inner diameter of the annular rib is larger than an outer diameter of the parking gear and is equal to or smaller than an outer diameter of the driven pulley.

4. The continuously variable transmission according to claim 1, wherein
a gap between the annular rib and the fixed-side pulley half of the driven pulley is smaller than a width of the rings constituting the belt.

5. The continuously variable transmission according to claim 1, wherein
the annular rib covers the outer periphery of the parking gear by at least 180 degrees.

6. The continuously variable transmission according to claim 1, wherein
the case includes a shielding rib extending from the annular rib, and
the shielding rib extends toward a swing fulcrum of the parking pawl, and has a tip end having a gap from the parking gear equal to or smaller than a predetermined width in a state where the parking pawl is not fitted.

7. The continuously variable transmission according to claim 6, wherein
the shielding rib has a shape warped toward the drive pulley.

8. The continuously variable transmission according to claim 7, wherein
the case includes an isolated rib provided on a side closer to the drive pulley than is the shielding rib and isolated from the shielding rib,
the parking pawl includes a projection at a lower portion thereof,
the projection is provided between the isolated rib and the shielding rib, and
a gap between the projection and the isolated rib is equal to or smaller than a predetermined width in the state where the parking pawl is not fitted.

9. The continuously variable transmission according to claim 1, wherein
the case includes a coupling rib extending from a lower portion of the annular rib and coupled to a lower end of the case.

10. The continuously variable transmission according to claim 9, wherein
the coupling rib is formed continuously from the annular rib to the lower end of the case without a break.

11. The continuously variable transmission according to claim 1, further comprising, in the case:
a parking rod configured to swing the parking pawl; and
a guide member configured to guide the parking rod, wherein
the case includes
a guide support supporting the guide member, and
an auxiliary rib extending from the guide supporting portion and having a gap from the drive pulley equal to or smaller than a predetermined width.

12. The continuously variable transmission according to claim 11, wherein
the guide member includes a guide extension extending toward the drive pulley.

13. The continuously variable transmission according to claim 12, wherein
the guide extension covers at least a part of a side surface of the auxiliary rib.

* * * * *